US010291951B2

(12) United States Patent
Wang

(10) Patent No.: US 10,291,951 B2
(45) Date of Patent: May 14, 2019

(54) VIDEO CHANNEL DISPLAY METHOD AND APPARATUS

(71) Applicant: Alibaba Group Holding Limited, Grand Cayman (KY)

(72) Inventor: Guonai Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 387 days.

(21) Appl. No.: 15/290,303

(22) Filed: Oct. 11, 2016

(65) Prior Publication Data

US 2017/0034566 A1    Feb. 2, 2017

Related U.S. Application Data

(63) Continuation of application No. 14/745,286, filed on Jun. 19, 2015, now Pat. No. 9,495,727.

(30) Foreign Application Priority Data

Jun. 27, 2014  (CN) .......................... 2014 1 0302686

(51) Int. Cl.
*H04N 21/43* (2011.01)
*H04N 11/24* (2006.01)
(Continued)

(52) U.S. Cl.
CPC .......... *H04N 21/4305* (2013.01); *G06T 3/40* (2013.01); *H04N 11/002* (2013.01);
(Continued)

(58) Field of Classification Search
CPC ............. H04N 21/4305; H04N 11/002; H04N 21/42607; H04N 21/42615; H04N 21/42653; G06T 3/40
See application file for complete search history.

(56) References Cited

U.S. PATENT DOCUMENTS

2001/0038642 A1    11/2001  Alvarez, II et al.
2002/0063796 A1    5/2002   Min
(Continued)

FOREIGN PATENT DOCUMENTS

CN    EP1178686 A2    2/2002
CN    101083771 A    12/2007
(Continued)

OTHER PUBLICATIONS

Translation of Chinese Office Action from corresponding Chinese Patent Application No. 201410302686X, dated Nov. 15, 2017, 5 pages.
(Continued)

*Primary Examiner* — Hung Q Dang
*Assistant Examiner* — Sunghyoun Park
(74) *Attorney, Agent, or Firm* — Lee & Hayes, P.C.

(57) ABSTRACT

Methods for video display using a computing system. The computing system includes a main computing module and an ancillary computing module. The main computing module may transmit a synchronization control information block to the ancillary computing module. The synchronization control information block includes a frame number of a current frame and the reference time associated with the main computing module. The ancillary computing module receives the synchronization control information block and selects a frame pack having the same frame number contained in the synchronization control information block as the current frame. The ancillary computing module may obtain the reference time of the current frame based on a local time of the ancillary computing module. The main computing module and the ancillary computing module may decode one or more parts of the frame, respectively. Further, the decoded parts of the frame may be combined and displayed.

20 Claims, 2 Drawing Sheets

(51) Int. Cl.
*H04N 21/426* (2011.01)
*G06T 3/40* (2006.01)

(52) U.S. Cl.
CPC . *H04N 21/42607* (2013.01); *H04N 21/42615* (2013.01); *H04N 21/42653* (2013.01)

(56) References Cited

U.S. PATENT DOCUMENTS

| | | |
|---|---|---|
| 2003/0066094 A1 | 4/2003 | van der Schaar et al. |
| 2003/0165196 A1 | 9/2003 | Demas et al. |
| 2004/0264577 A1 | 12/2004 | Jung |
| 2008/0298473 A1 | 12/2008 | Gou |
| 2009/0148131 A1 | 6/2009 | Akgul |
| 2010/0092156 A1 | 4/2010 | McCrossan et al. |
| 2010/0135381 A1 | 6/2010 | Hamamoto et al. |
| 2011/0229106 A1 | 9/2011 | Cho |
| 2012/0002731 A1* | 1/2012 | Pelts .................. H04N 7/52 375/240.25 |
| 2012/0170648 A1 | 7/2012 | Chen et al. |
| 2013/0083859 A1* | 4/2013 | Nemiroff ........... H04N 21/4305 375/240.25 |
| 2013/0279888 A1* | 10/2013 | Zeng .................. H04N 21/4307 386/357 |
| 2014/0020013 A1* | 1/2014 | DiLorenzo ........... H04N 21/812 725/32 |
| 2014/0078148 A1 | 3/2014 | Diard et al. |
| 2014/0237536 A1 | 8/2014 | Jang et al. |
| 2014/0359075 A1* | 12/2014 | Amidei ................. H04L 65/607 709/219 |
| 2015/0201154 A1 | 7/2015 | Lam et al. |
| 2015/0380056 A1 | 12/2015 | Wang |

FOREIGN PATENT DOCUMENTS

| | | |
|---|---|---|
| CN | 101959071 A | 1/2011 |
| WO | WO2008028013 | 3/2008 |

OTHER PUBLICATIONS

Translation of Chinese Search Report from corresponding Chinese Patent Application No. 201410302686X, dated Oct. 30, 2017, 2 pages.
PCT Search Report and Written Opinion dated Sep. 30, 2015 for PCT Application No. PCT/US15/36805, 7 pages.

\* cited by examiner

VIDEO CHANNEL DISPLAY METHOD AND APPARATUS

CROSS REFERENCE TO RELATED PATENT APPLICATIONS

This application claims priority to and is a continuation of U.S. patent application Ser. No. 14/745,286, filed Jun. 19, 2015, entitled "Video Channel Display Method and Apparatus," which claims priority to Chinese Patent Application No. 201410302686.X, filed on Jun. 27, 2014, entitled "Video Channel Display Method And Apparatus," which are hereby incorporated by reference in their entirety.

TECHNICAL FIELD

The present disclosure relates to computer video display technology, and more specifically to methods and systems for video display.

BACKGROUND

Current high definition (HD) display devices may display video contents in a resolution of 1920*1080 pixels (2K*1K or full HD). With the development of information technology, various higher resolutions, such as 6K or 8K, are available for video contents.

Existing displaying devices may not be able to play video contents in resolutions higher (6K or 8K) than 2K*1K. Under conventional techniques, such video contents in higher resolutions may be converted to lower resolutions (e.g., 1920*1080 pixels). However, not only is the conversion process too computationally expensive but also may cause converted videos to become distorted and blur.

Accordingly, problems for displaying video contents in resolutions higher than full HD need to be addressed.

SUMMARY

Implementations of the present disclosure solve problems associated with conventional techniques, such as failures for displaying videos in higher resolutions than full HD, distorted images, and/or blur images. This Summary is not intended to identify all key features or essential features of the claimed subject matter, nor is it intended to be used alone as an aid in determining the scope of the claimed subject matter.

The implementations of the present disclosure relate to methods for video display. In implementations, a main computing module and one or more ancillary computing module read a video file, for example at substantially the same time. The main computing module may retrieve a current frame of a frame stream of the video file and read a display time and/or a decoding time of the current frame based on a frame number of the current frame and a local time of the main computing module. The main computing module may transmit to the one or more ancillary computing module a synchronization control information block containing the frame number of the current frame and the display time and/or the decoding time associated with the main computing module. The main computing module decodes a first part of the current frame. The ancillary computing module receives the synchronization control information block and selects a frame pack having the same frame number contained in the synchronization control information block as the current frame. Further, the ancillary computing module reads the display time and/or decoding time of the current frame on the ancillary computing module based on a local time of the ancillary computing module, and decodes a $N^{th}$ part of the current frame based on a predetermined assignment. The decoded parts of the current frame from the ancillary computing module and decoded parts of the current frame from the main computing module may be combined to form a decoded content of the current frame. A displaying device may then display the decoded content.

In implementations, the one or more ancillary computing modules may include an ancillary computing module. The main computing module may decode an upper half or lower half of the current frame. Accordingly, the ancillary computing module may decode a lower half or upper half of the current frame. In some instances, the main computing module may decode a right half or left half of the current frame, while the ancillary computing module may decode a left half or right half of the current frame.

In implementations, the ancillary computing module reads the display time and/or decoding time of the current frame on the ancillary computing module based on a local time of the ancillary computing module. The ancillary computing module may calculate a difference between the display time and/or decoding time of the ancillary computing module and the display time and/or decoding time of the synchronization control information block, and further determine whether the difference falls in a predetermined threshold range. If the difference falls in a predetermined threshold range, the ancillary computing module decodes a $N^{th}$ part of the current frame based on a predetermined assignment. If the difference does not fall in a predetermined threshold range, the ancillary computing module resets the local time of the ancillary computing module based on the display time and/or decoding time contained in the synchronization control information block. Further the ancillary computing module decodes the $N^{th}$ part of the current frame based on a predetermined assignment.

In implementations, the ancillary computing module may reset the local time of the ancillary computing module based on the display time and/or decoding time contained in the synchronization control information block. The ancillary computing module may designate the display time contained in the synchronization control information block as a display time of the ancillary computing module, and may designate the decoding time contained in the synchronization control information block as the decoding time of the ancillary computing module.

In implementations, the predetermined threshold range is a time period of persistence of vision of a human eye. The decoding may be implemented by calling ffmpeg decoding and display functions. In some implementations, the main computing module and the ancillary computing module communicates using local area network (LAN), Internet or data bus, Wi-Fi, or Bluetooth to transmit the synchronization control information block.

In implementations, the synchronization control information block is implemented using a data block defined by a function. The data block includes the frame number, and the display time and/or deciding time.

The implementations of the present disclosure relate to systems for video display. A system for video display may include a main computing module and one or more ancillary computing module. The main computing module may include an acquiring module configured to retrieve a current frame of a frame stream of the video file, and a reading module configured to read the display time and/or decoding time of the current frame on the ancillary computing module based on a local time of the ancillary computing module.

The main computing module may further include a transmitting module configured to transmit to the one or more ancillary computing module a synchronization control information block containing the frame number and the display time and/or the decoding time, and a first decoding module configured to decode a first part of the current frame.

The ancillary computing module may include a receiving module configured to receive the synchronization control information block and select a frame pack having the same frame number contained in the synchronization control information block as the current frame, and a reading module configured to obtain the display time and/or decoding time of the current frame on the ancillary computing module based on a local time of the ancillary computing module. The ancillary computing module may further include a $N^{th}$ decoding module configured to the ancillary computing module that decodes a Nth part of the current frame based on a predetermined assignment, and a displaying module configured to combine decoded parts of the current frame from the ancillary computing module and decoded parts of the current frame from the main computing module to form a decoded content of the current frame, and to display the decoded content.

In implementations, the first decoding module may decode an upper half or lower half of the current frame. Accordingly, a $N^{th}$ decoding module may decode a lower half or upper half of the current frame. In implementations, the first decoding module may decode a right half or left half of the current frame. Accordingly, the $N^{th}$ decoding module may decode a left half or right half of the current frame.

In implementations, the ancillary computing module may include a determining module configured to obtain the display time and/or decoding time of the current frame on the ancillary computing module based on a local time of the ancillary computing module. The determining module may further calculate a difference between the display time and/or decoding time of the ancillary computing module and the display time and/or decoding time of the synchronization control information block, and determine whether the difference falls in a predetermined threshold range.

If the difference falls in the predetermined threshold range, the ancillary computing module may transmit a decoding signal to the $N^{th}$ decoding module. If the difference does not fall in the predetermined threshold range, the ancillary computing module may transmit a resetting signal to a resetting module. The resetting module may be configured to reset the local time of the ancillary computing module based on the display time and/or decoding time contained in the synchronization control information block. The $N^{th}$ decoding module decodes the $N^{th}$ part of the current frame based on a predetermined assignment.

In implementations, the resetting module may be configured to designate the display time contained in the synchronization control information block as a display time of the ancillary computing module, and to designate the decoding time contained in the synchronization control information block as the decoding time of the ancillary computing module.

In implementations, the predetermined threshold range is a time period of persistence of vision of a human eye. The decoding between the first decoding module and the Nth decoding module may be implemented by calling ffmpeg decoding and display functions.

Compared with conventional techniques, one aspect of the present disclosure has the following advantages. The main computing module and the ancillary computing module read the same video frame stream, and the main computing module decodes the first part of the current frame. The main computing module transmits to the one or more ancillary computing module a synchronization control information block containing the frame number of the current frame and the display time and/or the decoding time associated with the main computing module. The ancillary computing module receives the synchronization control information block and selects a frame pack having the same frame number contained in the synchronization control information block as the current frame. The ancillary computing module decodes a $N^{th}$ part of the current frame based on a predetermined assignment. The decoded parts of the current frame from the ancillary computing module and decoded parts of the current frame from the main computing module may be combined to form a decoded content of the current frame, which is displayed. This enables the display video files in higher resolution than full HD.

The implementations herein also generate a predetermined assignment to assign the decoding of the video frame stream to the main computing module and the ancillary computing module. Based on the assignment, the main computing module and the ancillary computing module decode various parts of the video frame stream accordingly. The decoded parts of the current frame from the ancillary computing module and decoded parts of the current frame from the main computing module may be combined to form a decoded content of the current frame, which is displayed. After using this method, when a video file is a high resolution video file, a decoding process will not be restricted to the computing power of decoding devices. Therefore, this avoids distorted images or blurred images for displaying high resolution video files due to limited computing power.

BRIEF DESCRIPTION OF THE DRAWINGS

The Detailed Description is described with reference to the accompanying figures. The use of the same reference numbers in different figures indicates similar or identical items.

DETAILED DESCRIPTION

The present disclosure may be implemented in many ways other than those described herein, and those skilled in the art may make similar promotion without departing from the present disclosure. Therefore, the present disclosure is not limited to the particular implementation described below.

Figure 1:
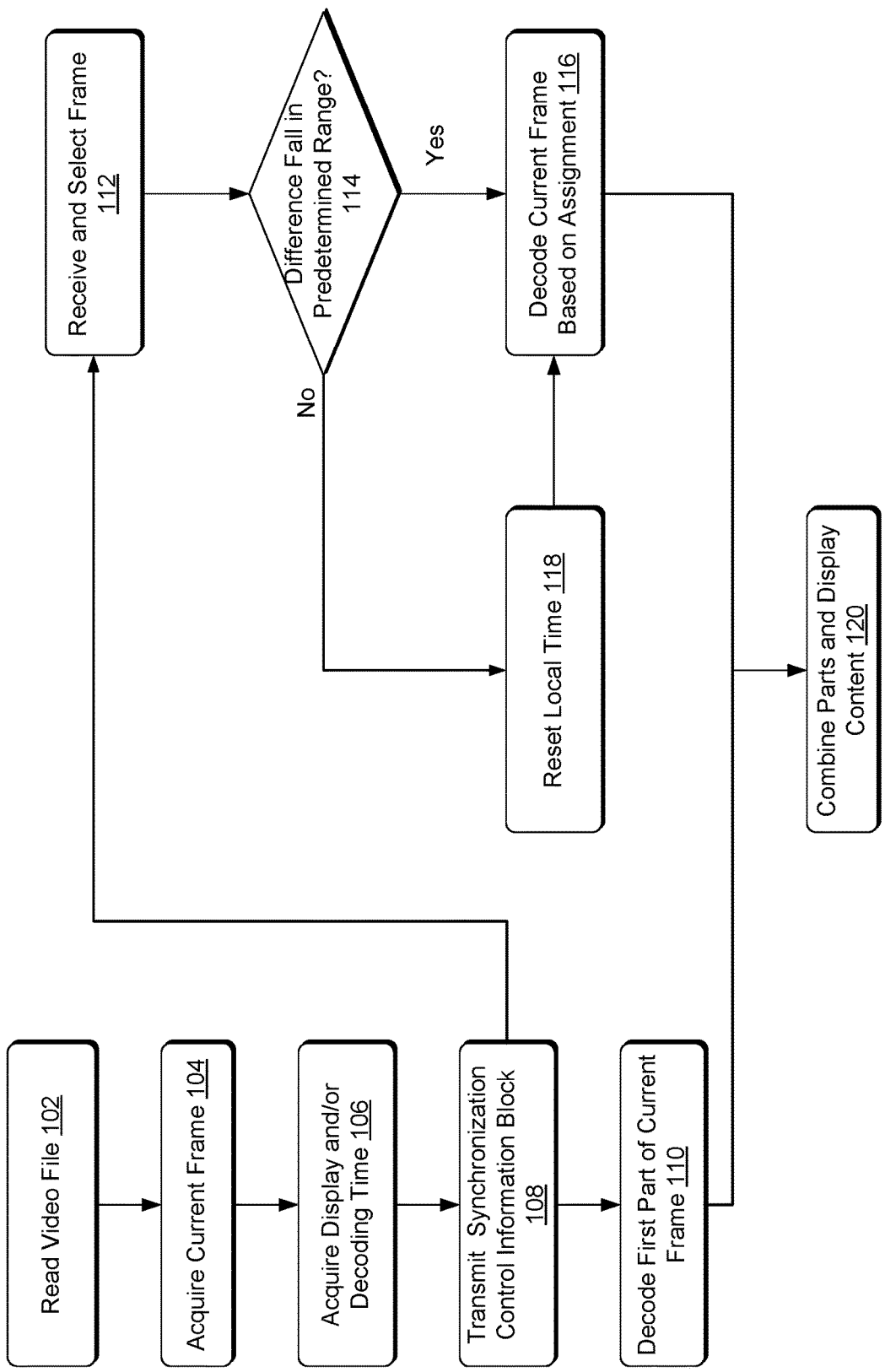
FIG. 1 is a flow chart of an illustrative process for displaying a video file.

FIG. 1 is a flow chart of an illustrative process for displaying a video file. FIG. 1 illustrates operations of a main computing module and one or more ancillary computing modules.

At 102, a main computing module and an ancillary computing module read and process a video file. The main computing module and the ancillary computing module read a video file, which may be obtained from a local hard drive associated with the main computing module or the ancillary computing module. In implementations, the video file may be obtained via a connection node of a network, from an Internet server, or directly from a device that captures information and generates the video file.

In implementations, the main computing module may be a local computing device, and the ancillary computing module may be at least one computing unit of a distributed computing network associated with the main computing module. In implementations, the ancillary computing module may a local computing device, and the main computing module may be at least one computing unit of a distributed computing network associated with the main unit. In implementations, the main computing module and ancillary computing module may be computing units of a distributed computing network. The number of the ancillary computing modules may change based on demands. Accordingly, the ancillary computing module is not limited to completing corresponding calculation process on the local computing device. The ancillary computing modules may include multiple ancillary computing modules.

In implementations, two computing units: the main computing module and the ancillary computing module, may have a dynamic relationship. For example, when there are multiple computing units, one computing unit may be determined as the main computing module and the rest of the multiple computing units may be considered as ancillary computing modules. The main computing module and the ancillary computing module may communicate using LAN, Internet or data bus, Wi-Fi, Bluetooth to transmit the synchronization control information block.

At 104, the main computing module may retrieve and acquire a current frame of a frame stream of the video file. For example, this operation may be implementation by calling an opencv function. The main computing module may adopt a cvQueryFrame function to retrieve the current frame of the video frame stream of the video file. It is appreciated that retrieving the current frame of the video stream can be implemented using other methods.

At 106, the main computing module may read and acquire a display time and/or a decoding time of the current frame based on a frame number of the current frame and a local time of the main computing module. In implementations, the main computing module may obtain a display time and/or a decoding time of the current frame based on a frame number of the current frame and a local time of the main computing module.

The main computing module reads a display time (e.g., presentation time stamp (PTS)) and/or a decoding time (e.g., decoding time stamp (DTS)) of the current frame based on a local time of the main computing module. The display time indicates a time when a frame pack is transmitted to a displaying device for display. The decoding time indicates a time when a frame pack is transmitted to a computing unit for decoding. A display order may be determined based on the display time and the decoding time. The display time and decoding time are generally consistent while being different in certain conditions.

In implementations, the main computing module and the ancillary computing module may be synchronized based on the decoding time and/or the display time. In implementations, the decoding time and display time may be used to avoid a situation that the main computing module and the ancillary computing module are not synchronized.

At 108, the main computing module transmits to the one or more ancillary computing module a synchronization control information block containing the frame number and the display time and/or the decoding time. The main computing module may define a data structure type, which may be in the form of data blocks. In implementations, the main computing module transmit to the ancillary computing module the frame number and the display time and/or the decoding time, which may be defined as a synchronization control information block. Such a definition may be implemented using a struct function. The main computing module may transmit the synchronization control information block to the ancillary computing module for storage.

For example, the synchronization control information block may be defined as follow:

```
struct syncMsg {
    Long PTS; // display time
    Long DTS; // decoding time
    Int FrameNo; // frame number
}
``` wherein, the data block includes the frame number, and the display time and/or deciding time.

At 110, the main computing module may decode the first part of the current frame to decode an upper half or lower half of the current frame or decode a right half or left half of the current frame. For example, this operation may be implemented by calling ffmpeg decoding and display functions.

At 112, the ancillary computing module may receive the synchronization control information block and may select a frame pack having the same frame number contained in the synchronization control information block as the current frame. In implementations, the ancillary computing module and the main computing module may obtain the same video frame stream, and may receive the synchronization control information block from the main computing module. For example, the ancillary computing module receives the synchronization control information block and selects a frame pack having the same frame number contained in the synchronization control information block as the current frame. The main computing module and the ancillary computing module may decode the content of the same frame.

In implementations, the ancillary computing module may read the display time and/or decoding time of the current frame on the ancillary computing module based on a local time of the ancillary computing module. The ancillary computing module may calculate a difference between the display time and/or decoding time of the ancillary computing module and the display time and/or decoding time of the synchronization control information block, and determine whether the difference falls in a predetermined threshold range. In some implementations, local times of the main computing module and the ancillary computing module are the same since the local times may be synchronized over the network, and therefore errors between the local times can be ignored.

In implementations, the ancillary computing module reads a display time (e.g., presentation time stamp (PTS)) and/or a decoding time (e.g., decoding time stamp (DTS)) of the current frame based on a local time of the ancillary computing module.

The ancillary computing module may calculate a difference between the display time and/or decoding time of the ancillary computing module and the display time and/or decoding time of the synchronization control information block, and determine whether the difference falls in a predetermined threshold range at 114.

If the difference falls in the predetermined threshold range, the ancillary computing module may decode the current frame based on the assignment at 116. For example, the predetermined threshold range may be a time period of persistence of vision of a human eye (e.g., 100 to 400 milliseconds) such as 200 milliseconds.

In implementations, the ancillary computing module decodes a $N^{th}$ part of the current frame based on a predetermined assignment. The $N^{th}$ part of the current frame corresponds to the first part of the current frame decoded by the main computing module.

In implementations, if the first part of the current frame decoded by the main computing module is the upper half of the current frame, then the $N^{th}$ part of the current frame decoded by the ancillary computing module is the lower half of the current frame, and vice versa. If the first part of the current frame decoded by the main computing module is the left half of the current frame, then the Nth part of the current frame decoded by the ancillary computing module is the right half of the current frame, and vice versa.

It should be noted that, when there are multiple computing units, one or more main computing modules and one or more ancillary computing modules are correlated. For example, the decoding between the first decoding module and the $N^{th}$ decoding module may be implemented by calling a ffmpeg decoding function.

If the difference of the display times and/or decoding times of the main computing module and the ancillary computing module is greater than a predetermined threshold range (e.g., human visual persistence value within 200 milliseconds), the ancillary computing module may reset the local time of the ancillary computing module based on the display time and/or decoding time contained in the synchronization control information block at 118. The resetting process may enable the ancillary computing module to decode the current frame based on a local time of the ancillary computing module without frequently changing a pace of the ancillary computing module. Also, the resetting process may correct the local time of the ancillary computing module when the difference of video content is beyond the scope that human eyes can perceive with respect to a normal view.

In implementations, the ancillary computing module may decode a $N^{th}$ part of the current frame based on a predetermined assignment. The ancillary computing module may designate the display time contained in the synchronization control information block as a display time of the ancillary computing module, and designate the decoding time contained in the synchronization control information block as the decoding time of the ancillary computing module. This will make consistent between the display time and/or decoding time of the ancillary computing module and the display time and decoding time contained in the synchronization control information block. Further, the decoding of the Nth part of the current frame may be implemented by calling a ffmpeg decoding function.

At 120 a displaying module may combine decoded parts of the current frame from the ancillary computing module and decoded parts of the current frame from the main computing module to form a decoded content of the current frame, which may be displayed. For example, the main computing module may transmit the first part of decoded content to a buffer zone of the displaying module, and the ancillary computing module may also transmit the $N^{th}$ part of the decoded content to the buffer zone. The displaying module may combine the decoded content in the buffer zone and display the combined decoded content.

In implementations, the main computing module may decode the first part of the current frame and then the displaying module may display the decoded first part. The ancillary computing module may decode the $N^{th}$ part of the current frame and then the displaying module may display the decoded $N^{th}$ part.

The implementations of the present disclosure relate to methods for video display. The main computing module and the ancillary computing module read the same video frame stream. Based on the assignment, the main computing module and the ancillary computing module decode various parts of the video frame stream respectively. The decoded parts of the current frame from the ancillary computing module and decoded parts of the current frame from the main computing module may be combined to form a decoded content of the current frame, and to display the decoded content. The implementations herein can avoid image distortion and image blurring due to excessive decoding computation that is beyond computing capacities.

In above described implementations, the main computing module and the ancillary computing module may correspond to two network nodes that are in long distance. Therefore, implementations can call on the network to achieve full computing power, in particular the use of cloud computing approach for high definition video display. The implementations may determine a difference between the display time and/or decoding time of the ancillary computing module and the display time and/or decoding time of the synchronization control information block, and determine whether the difference falls in a predetermined threshold range. The decoding time and the display time may be reset if the difference is greater than the predetermined threshold range. The above determination may avoid a long interval due to different display times generated by the main computing module and the ancillary computing module when the ancillary computing module and the ancillary computing module decode different parts of the same frame respectively. In some implementations, the resetting process may be removed.

Figure 2:
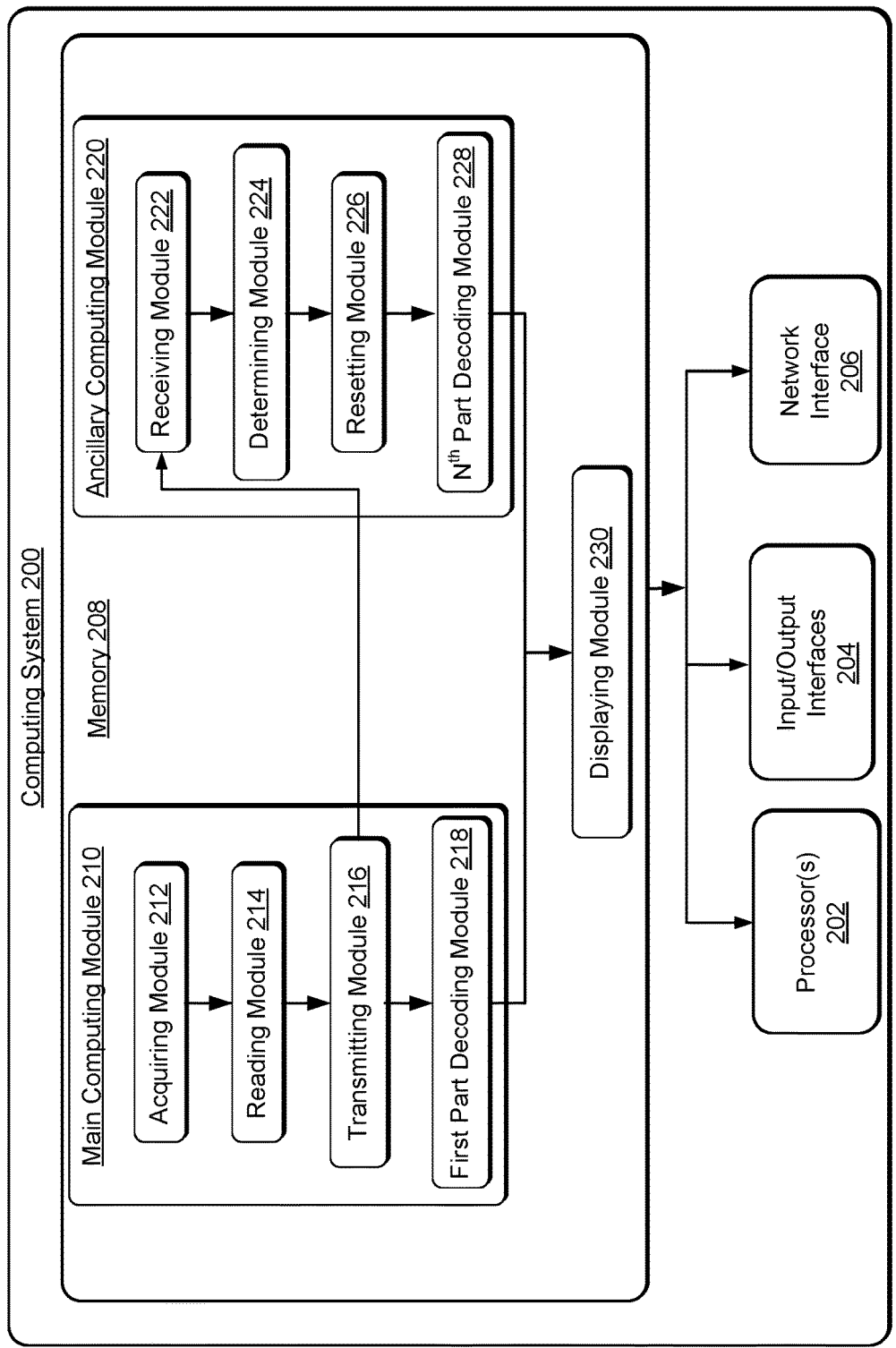
FIG. 2 is schematic diagram of an illustrative computing architecture that enables displaying a video file.

FIG. 2 is a schematic diagram of an illustrative computing architecture that enables displaying a video file. FIG. 2 is a diagram of a computing system 200. The computing system 200 may be one or more user devices or one or more servers for video display, a combination thereof. In one exemplary configuration, the computing system 200 includes one or more processors 202, input/output interfaces 204, network interface 206, and memory 208.

The memory 208 may include computer-readable media in the form of volatile memory, such as random-access memory (RAM) and/or non-volatile memory, such as read only memory (ROM) or flash RAM. The memory 208 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 208 in more detail, the memory 208 may include a main computing module 210, an ancillary computing module 220, and a displaying module 230. The main computing module 210 may include various components such as an acquiring module 212, a reading module 214, a transmitting module 216, and a first part decoding module 218. The ancillary computing module 220 may include various components such as a receiving module 222, a determining module 224, a resetting module 226, and a $N^{th}$ part decoding module 228.

The main computing module 210 and the ancillary computing module 220 may read the same video file. The acquiring module 212 may retrieve a current frame of a frame stream of the video file, and the reading module 214 may reads the display time and/or decoding time of the current frame on the ancillary computing module based on a local time of the main computing module. The transmitting module 216 may transmit to the ancillary computing module 218 a synchronization control information block containing the frame number and the display time and/or the decoding time, and the first part decoding module 218 may decode the first part of the current frame.

In implementations, the first part decoding module 218 decodes the first part of the current frame to decode an upper half or lower half of the current frame, or decode a right half or left half of the current frame.

The receiving module 222 may receive the synchronization control information block and select a frame pack having the same frame number contained in the synchronization control information block as the current frame. The determining module 224 may obtain the display time and/or decoding time of the current frame on the ancillary computing module based on a local time of the ancillary computing module, and calculate a difference between the display time and/or decoding time of the ancillary computing module and the display time and/or decoding time of the synchronization control information block. The determining module 224 may further determine whether the difference falls in a predetermined threshold range.

If the difference does not fall in a predetermined threshold range, the determining module 224 may transmit a resetting signal to the resetting module 226. If the difference falls in a predetermined threshold range, the determining module 224 may transmit a decoding signal to the $N^{th}$ part decoding module 228.

The resetting module 226 may reset the local time of the ancillary computing module based on the display time and/or decoding time contained in the synchronization control information block, and then transmit a decode signal to the $N^{th}$ part decoding module 228. The $N^{th}$ part decoding module 228 may decode a $N^{th}$ part of the current frame based on a predetermined assignment. The resetting module 226 may designate the display time contained in the synchronization control information block as a display time of the ancillary computing module 220, and designate the decoding time contained in the synchronization control information block as the decoding time of the ancillary computing module 220.

The $N^{th}$ part decoding module 228 may decode a $N^{th}$ part of the current frame based on a predetermined assignment to decode a $N^{th}$ part of the current frame based on a predetermined assignment. The decoding of the $N^{th}$ part decoding module 228 may correspond to the lower part or the upper part of the current frame decoded by the first part decoding module 218. In implementations, the $N^{th}$ part decoding module 228 may decode a left half or right half of the current frame.

The displaying module 230 may combine decoded parts of the current frame from the ancillary computing module and decoded parts of the current frame from the main computing module to form a decoded content of the current frame, which may be displayed on a displaying device.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:

1. A method comprising:
retrieving a current frame of a video file;
obtaining a reference time of the current frame based at least in part on a frame number of the current frame and a local time of a first computing device;
decoding a first part of the current frame;
transmitting a synchronization control information block containing the frame number and the reference time of the current frame to a second computing device to decode a second part of the current frame;
receiving the decoded second part of the current frame from the second computing device;
combining the decoded first part and the decoded second part of the current frame to form a decoded content of the current frame; and
displaying the decoded content of the current frame.

2. The method of claim 1, wherein the reference time of the current frame comprises one or more of a display time or a decoding time associated with the first computing device.

3. The method of claim 1, wherein the first part of the current frame comprises one of an upper half or a right half of the current frame, and the second part of the current frame comprises one of a lower half or a left half of the current frame correspondingly.

4. The method of claim 1, wherein the synchronization control information block is transmitted via a local area network (LAN), an Internet, a data bus, Wi-Fi or Bluetooth.

5. The method of claim 1, wherein the synchronization control information block is implemented using a data block defined by a function, and wherein the data block includes the frame number of the current frame and the reference time associated with the first computing device.

6. One or more computer-readable media storing executable instructions that, when executed by a first computing device, cause the first computing device to perform acts comprising:
receiving a synchronization control information block containing a frame number and a reference time of a current frame from a second computing device;
selecting a frame pack having the frame number contained in the synchronization control information block as the current frame;
decoding a first part of the current frame based on a predetermined assignment;
sending the decoded first part of the current frame to the second computing device to form a decoded content of the current frame from a combination of the decoded first part of the current frame with a second part of the current frame decoded by the second computing device.

7. The one or more computer-readable media of claim 6, further comprising:
calculating a time difference between a reference time of the first computing device and the reference time contained in the synchronization control information block; and determining whether the time difference falls in a predetermined threshold range.

8. The one or more computer-readable media of claim 7, wherein the second part of the current frame is decoded after determining that the time difference falls in the predetermined threshold range.

9. The one or more computer-readable media of claim 7, the acts further comprising resetting a local time of the first computing device based on the reference time contained in the synchronization control information block and decoding the second part of the current frame after determining that the time difference does not fall in the predetermined threshold range.

10. The one or more computer-readable media of claim 9, wherein the synchronization control information block further comprises a display time and a decoding time, and wherein resetting the local time of the first computing device comprises:
designating the display time contained in the synchronization control information block as a display time of the first computing device; and
designating the decoding time contained in the synchronization control information block as a decoding time of the first computing device.

11. The one or more computer-readable media of claim 7, wherein the predetermined threshold range corresponds to a time period of persistence of vision of a human eye.

12. The one or more computer-readable media of claim 6, wherein the reference time of the current frame comprises one or more of a display time or a decoding time associated with the second computing device.

13. The one or more computer-readable media of claim 6, wherein the first part of the current frame comprises one of an upper half or a right half of the current frame, and the second part of the current frame comprises one of a lower half or a left half of the current frame correspondingly.

14. The one or more computer-readable media of claim 6, wherein the synchronization control information block is received via a local area network (LAN), an Internet, a data bus, Wi-Fi or Bluetooth.

15. The one or more computer-readable media of claim 6, wherein the synchronization control information block is implemented using a data block defined by a function, and wherein the data block includes the frame number of the current frame and the reference time associated with the second computing device.

16. A system comprising:
one or more processors;
memory;
a first computing module, a second computing module and a displaying module that are stored in the memory and executable by the one or more processors, wherein the first computing module is configured to:
retrieve a current frame of a video file,
obtain a reference time of the current frame based at least in part on a frame number of the current frame and a local time of the first computing module,
decode a first part of the current frame, and
transmit a synchronization control information block containing the frame number and the reference time of the current frame to the second computing module;
the second computing module is configured to:
receive the synchronization control information,
select a frame pack having the frame number contained in the synchronization control information block as the current frame, and
decode a second part of the current frame based on a predetermined assignment, the second part being different from the first part;
the displaying module is configured to:
combine the decoded first part and the decoded second part of the current frame to form a decoded content of the current frame, and
display the decoded content of the current frame.

17. The system of claim 16, wherein the second computing module is further configured to calculate a time difference between a reference time of the second computing module and the reference time contained in the synchronization control information block, and determine whether the time difference falls in a predetermined threshold range.

18. The system of claim 17, wherein the second computing module is further configured to decode the second part of the current frame if determining that the time difference falls in the predetermined threshold range.

19. The system of claim 17, wherein the second computing module is further configured to reset a local time of the second computing module based on the reference time contained in the synchronization control information block and decode the second part of the current frame if determining that the time difference does not fall in the predetermined threshold range.

20. The system of claim 19, wherein the synchronization control information block further comprises a display time and a decoding time, and the second computing module resets the local time of the second computing module at least in part by:
designating the display time contained in the synchronization control information block as a display time of the second computing module; and
designating the decoding time contained in the synchronization control information block as a decoding time of the second computing module.

* * * * *